United States Patent [19]
Noda et al.

[11] Patent Number: 5,324,785
[45] Date of Patent: Jun. 28, 1994

[54] POLYTETRAFLUOROETHYLENE FINE PARTICLES AND POWDER

[75] Inventors: Yoshihisa Noda; Kazutaka Hosokawa; Toshio Mizuno; Kiyohiko Ihara; Tetsuo Shimizu, all of Osaka, Japan

[73] Assignee: Daikin Industries Ltd., Osaka, Japan

[21] Appl. No.: 133,787

[22] Filed: Oct. 8, 1993

Related U.S. Application Data

[63] Continuation of Ser. No. 779,318, Oct. 18, 1991, abandoned.

[30] Foreign Application Priority Data

Oct. 19, 1990 [JP] Japan .................. 2-282413

[51] Int. Cl.$^5$ ............... C08F 259/08; C08F 14/26
[52] U.S. Cl. .................. 525/276; 525/902; 525/64; 526/255
[58] Field of Search .......... 525/199, 276, 902; 526/255

[56] References Cited

U.S. PATENT DOCUMENTS

| | | | |
|---|---|---|---|
| 4,036,802 | 7/1977 | Poirier | 428/422 |
| 4,363,900 | 12/1982 | Shimizu | 526/255 |
| 4,368,296 | 1/1983 | Kuhls et al. | 525/276 |
| 4,408,007 | 10/1983 | Kuhls et al. | 524/546 |
| 4,469,846 | 9/1984 | Khan | 525/276 |
| 4,952,630 | 8/1990 | Morgan | 525/199 |

FOREIGN PATENT DOCUMENTS

| | | |
|---|---|---|
| 0030664 | 6/1981 | European Pat. Off. |
| 0127407 | 12/1984 | European Pat. Off. |
| 0221554 | 5/1987 | European Pat. Off. |
| 0322877 | 7/1989 | European Pat. Off. |

*Primary Examiner*—David Buttner
*Attorney, Agent, or Firm*—Birch, Stewart, Kolasch & Birch

[57] ABSTRACT

Colloidal polytetrafluoroethylene fine particles having an average particle size of 0.05 to 1.0 μm and each comprising a core made of polytetrafluoroethylene which has a high molecular weight and can be fibrilled and a shell surrounding the core and made of a low molecular weight polytetrafluoroethylene which is not fibrilled, which has good dispersibility in water or an organic solvent and easily provides an organosol by a phase transfer method.

10 Claims, 3 Drawing Sheets

POLYTETRAFLUOROETHYLENE FINE PARTICLES AND POWDER

This application is a continuation of application Ser. No. 07/779,318 filed on Oct. 18, 1991, now abandoned.

BACKGROUND OF THE INVENTION

1. Field of the Invention

The present invention relates to polytetrafluoroethylene fine particles and powder.

2. Description of the Related Art

Polytetrafluoroethylene (PTFE) is commercially available in the form of fine particles or powder as a molding material, and its molded articles are used in various fields since PTFE is excellent in heat and cold resistance, flame retardance, slidability, non-tackiness, soil-proofing, chemical resistance, weather resistance, electrical properties and the like. Further, PTFE fine particles or powder are used as a modifier by dispersing in or blending with other materials.

For blend with a structural material such as a molding resin or elastomer, PTFE powder is used, while for dispersion in a liquid or semi-solid material such as a coating material, a paint, an oil, a grease or an ink, fine particles or powder of PTFE are used.

The PTFE fine particles are in a colloidal form having an average particle size of 0.05 to 1.0 $\mu$m and prepared by emulsion polymerization of tetrafluoroethylene in an aqueous medium in the presence of a surfactant. Usually, they are available in the form of an aqueous dispersion (latex). On the other hand, the powder type PTFE includes a coagulated powder (fine powder) of PTFE fine particles which is prepared by coagulating the above aqueous dispersion and drying the coagulated product and has an average particle size of 100 to 1000 $\mu$m and granular particles (granular or molding powder) which is prepared by suspension polymerization of tetrafluoroethylene in the presence of a small amount of a surfactant or in the absence of a surfactant. Both powders are widely used as molding powders. Among the above powders, some powders which are heated treated at a temperature higher than a melting point of PTFE are commercially distributed. Such powders are prepared by heating the raw powder at a temperature higher than the melting point and then pulverizing it.

The fine powder or the molding powder which is used as a raw material of molding consists of PTFE having a sufficiently high molecular weight and seldomly used as a modifier of other materials by dispersion or blend except in very special cases. The major reason why these powders are not suitable for dispersion or blend is that the powders are fibrilled during dispersing or blending.

Fibrillation of PTFE appears, in particular, in a virgin powder which has not been subjected to the heat treatment at a temperature higher than the PTFE melting point after polymerization, inter alia, the colloidal fine particles and the fine powder which are prepared by emulsion polymerization.

The PTFE fine powder is usually molded by "paste extrusion" comprising mixing the powder with a lubrication aid to form a paste, filling the paste form powder in a cylinder having a thin orifice and cold extruding it. The extruded article is sintered to form a tube or a wire coating, or pressed in a film form to produce a sealing tape. Further, after pressing, the film is stretched to produce a porous film.

The paste extrusion is based on the fibrillation of the colloidal PTFE fine particles. Since the PTFE particles are fibrilled and tangled with each other during extrusion, mechanical strength is imparted to the molded article before heat treatment to some extent. However, since the PTFE is easily fibrilled with a small shear force, when the PTFE fine powder is blended with other resin or elastomer, it is fibrilled by a shear force generated by blending, whereby a viscosity of a mixture increases greatly so that no uniform mixing is possible.

When the PTFE latex is mixed with other materials preferably with paint or the like, the colloidal PTFE fine particles are difficult to redisperse if they are once coagulated, so that a uniform dispersion state of the particles is not maintained.

The fibrillation property of the virgin PTFE, in particular, the colloidal fine particles depends on the molecular weight of PTFE and the fibrillation occurs in PTFE having a molecular weight higher than a certain value, and does not in PTFE having a low molecular weight. Then, fine particles and powder of a low molecular weight PTFE which is prepared by polymerizing tetrafluoroethylene under conditions to achieve the low molecular weight have been commercially sold.

When the high molecular weight PTFE is heated, usually at a temperature higher than the melting point, the fibrillation property almost disappears. This may be due to the difference of crystal structure between before and after heat treatment, that is, between the virgin PTFE and sintered PTFE. Irrespective of the molecular weight, the sintered PTFE has substantially no fibrillation property.

Accordingly, for dispersing in or blending with the molding resin material or the paint, the fine particles or powder of the low molecular weight PTFE or the high molecular weight PTFE which has been heat treated are suitable.

In general, polymers having a higher molecular weight have more preferable mechanical properties. For the improvement of slidability which is one main object of the dispersion or blend of fine particles or powder of PTFE, the addition of the higher molecular weight PTFE seems to achieve better abrasion resistance. Then, it is desired to produce fine particles or powder of PTFE which has a high molecular weight and is hardly fibrilled.

Though sintered PTFE having a high molecular weight is not produced in the form of colloidal fine particles, the powder form sintered PTFE, for example, high molecular weight PTFE such as molding powder which is sintered and pulverized is commercially sold. However, the high molecular weight virgin PTFE which has been sintered cannot be pulverized to a particle size of less than 70 $\mu$m by the usual mill or pulverizer, except that it is comminuted by a very special uneconomical method such as freeze comminuting. By the usual pulverizer, the produced particles have large anisotropy in shape, so that they are not practically usable fine particles for dispersion or blend. The commercially available sintered PTFE particles for molding has an average particle size of at least 100 $\mu$m. Though the commercially available sintered PTFE type powder for dispersion or blend is in the form of minute particles having a particle size of 10 to 40 $\mu$m, it is produced by subjecting scraps of sintered molded articles to an expensive treatment, for example, thermal decomposition or irradiation to decrease the molecular weight or by heating low molecular weight PTFE and pulverizing it. The sintered PTFE type powder produced by either of the above two methods has a low molecular weight.

Irrespective of the virgin PTFE or the sintered PTFE, the fine particles or powder of PTFE suitable for dispersion or blend has in general a low molecular weight and has a melt viscosity at 380° C. of about $1 \times 10^2$ to $1 \times 10^6$ poises, while the molding PTFE usually has a melt viscosity at 380° C. of at least $1 \times 10^8$ poises, preferably $1 \times 10^{11}$ to $1 \times 10^{12}$ poises.

For dispersion or blend, the fine particles or the powder of the virgin or sintered PTFE is used according to applications. In general, the virgin PTFE powder is soft and tends to be deformed during blending, while the sintered PTFE powder is hard and dense so that it often keeps the particle shape in the blend. Since the PTFE fine particles are dispersed by latex blending, they are more easily microdispersed than the powder.

To solve the above problems, various proposals have been made. For example, it is proposed to suppress the fibrillation characteristics while keeping the high molecular weight by providing fine particles, each having a core/shell structure, by coating surfaces of the colloidal PTFE fine particles with a different resin which is not fibrilled. Japanese Patent Kokai Publication No. 109846/1987 discloses fluorine-containing complex resin fine particles, each comprising a core made of PTFE and a shell made of a copolymer of tetrafluoroethylene (TFE) and chlorotrifluoroethylene (CTFE). Also, Japanese Patent Kokai Publication No. 284201 discloses similar core/shell particles comprising a core made of PTFE and a shell of an acrylic polymer. Both publications disclose the use of these core/shell particles in the form of an organosol which is easily redispersible. The invention of Japanese Patent Kokai Publication No. 247408/1989 is based on the same technical idea as Japanese Patent Kokai Publication No. 109846/1987 and intends to provide a powder suitable for blending with a resin or an elastomer by suppressing fibrillation of the core polymer through copolymerization of a modifying amount of hexafluoropropylene, perfluorobutylethylene, perfluoromethyl vinyl ether or perfluoropropyl vinyl ether.

However, though either one of the above prior art core/shell particles can be used in one specific application, a sintered type high molecular weight powder for a blend cannot be obtained in the form of spherical shape particles by coagulating the aqueous dispersion, drying the recovered polymer particles, heating them and then pulverizing them since the particle size is greatly decreased and the particle shape becomes whisker like.

SUMMARY OF THE INVENTION

One object of the present invention is to provide a virgin PTFE fine particles or powder which has a high molecular weight and has good blending or dispersing properties in a resin, an elastomer, a paint, etc.

Another object of the present invention is to provide a sintered PTFE powder which has a high molecular weight and has good blending or dispersing properties in a resin, an elastomer, a paint, etc.

According to the present invention, there are provided colloidal PTFE fine particles having an average particle size of 0.05 to 1.0 μm and each comprising a core made of PTFE which has a high molecular weight and can be fibrilled and a shell surrounding said core and made of a low molecular weight PTFE which is not fibrilled, a PTFE powder obtained by coagulating and drying an aqueous dispersion containing said colloidal PTFE fine particles, and a sintered PTFE powder obtained by sintering and pulverizing said PTFE powder.

DETAILED DESCRIPTION OF THE INVENTION

Figure 1:
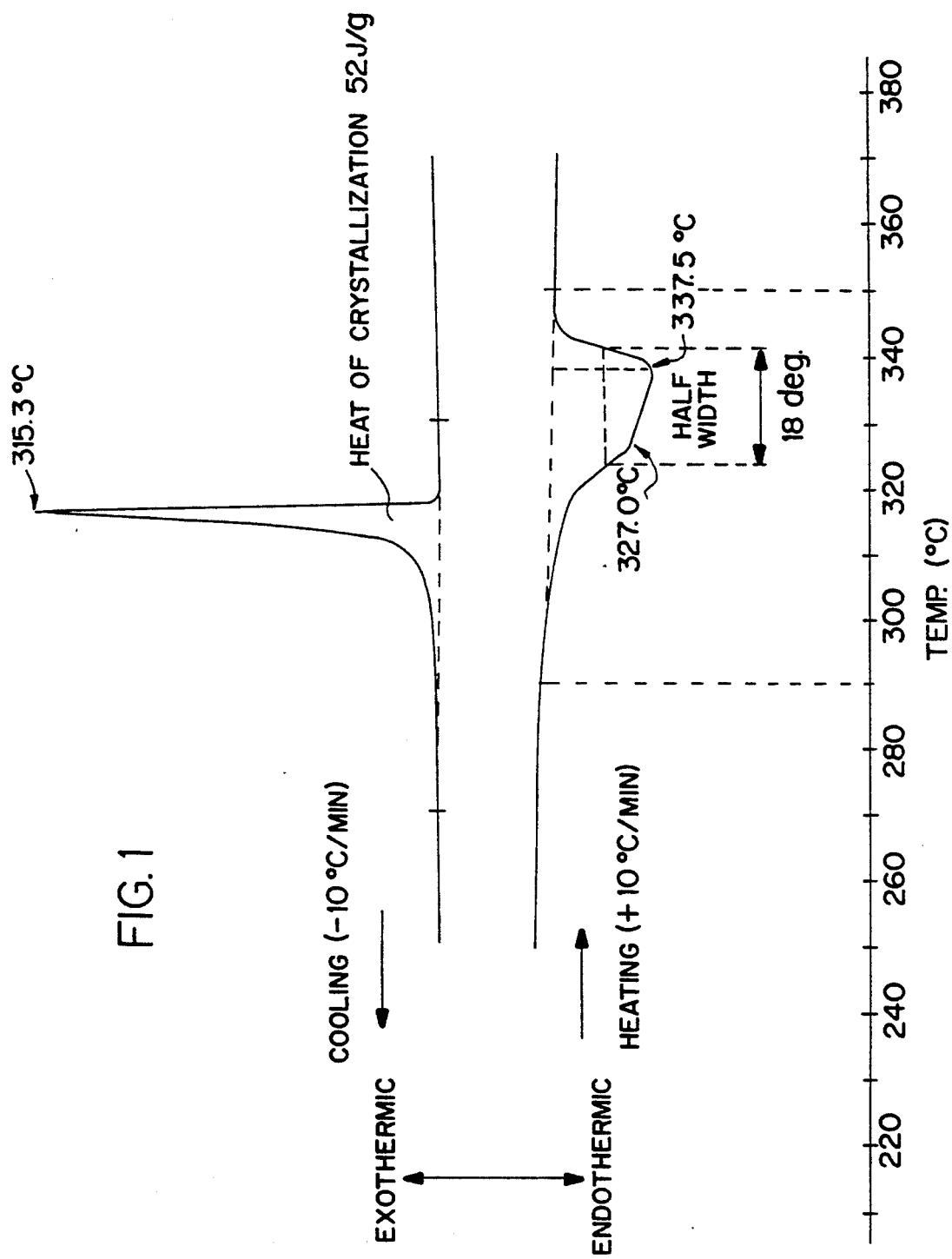
FIG. 1 is a DSC chart of the PTFE powder produced in Example 1.

An average molecular weight of the colloidal PTFE fine particles of the present invention as a whole is in a molecular weight range of the conventional high molecular weight PTFE which generally has the fibrillation characteristics. However, due to the core/shell structure, the PTFE fine particles of the present invention have much less fibrillation characteristics than the conventional colloidal PTFE having a continuous composition and no core/shell structure. One of the important features of the present invention is that the low molecular weight PTFE which cannot be fibrilled forms the shells of the particles while the particles have a high average molecular weight as a whole.

Since the shells of the particles are not fibrilled, the colloidal PTFE fine particles of the present invention are excellent in dispersion or blend properties, though they have a high molecular weight on the average.

Surprisingly, the PTFE powder obtained by coagulating and drying the aqueous dispersion of the colloidal PTFE fine particles is excellent in pulverizing properties after heat treatment. Therefore, according to the present invention, it is possible to provide the sintered PTFE powder having a high molecular weight and less shape anisotropy than the conventional powder.

The fact that the shells of the PTFE fine particles are not fibrilled is confirmed by paste extrusion. When an internal structure of the unsintered molded article produced by paste extrusion is observed, it is found that the colloidal PTFE fine particles are densely packed and connected by fibrils to each other. In other words, the article keeps its shape by the fibrilled parts of the shells of the colloidal PTFE fine particles. The same concept is disclosed in Japanese Patent Kokai Publication No. 247408/1989.

When the powder obtained by coagulating and drying the aqueous dispersion of the PTFE fine particles of the present invention is paste extruded, a molded article has lower strength and is brittle like a molded article produced from the commercially available low molecular weight PTFE powder for addition (see Examples below).

Good dispersion or blend property, inability of paste extrusion of the coagulated dry powder and pulverizability of the powder after heat treatment are all realized by the core/shell structure based on the molecular weight difference. These characteristics are not seen in a mere mixture of two types of PTFE fine particles having different molecular weights corresponding to the those of the core and shell and no clear core/shell structure.

The modified PTFE having the core/shell structure disclosed in Japanese Patent Kokai Publication No.

247408/1989 is of non-melt processable as a whole and does not form a melt flow, while the PTFE particles of the present invention has a specific melt flowability. That is, the PTFE fine particles of the present invention have a melt flowability to some extent though not only the cores themselves but also the whole particles have a sufficiently high molecular weight to be regarded as the non-melt processable polymer. This may be because since the shell part has a melt viscosity of about $10^2$ to $10^6$ poises which is sufficiently low to exhibit the melt flowability, it imparts flowability to the whole particle.

Because of the above core/shell structure, the PTFE polymer which constitutes the fine particles have a high average molecular weight and also a broad molecular weight distribution. Such molecular weight properties are characterized by crystalline melting and crystallization behaviors of the virgin polymer which are measured by a differential scanning calorimeter (DSC). In relation to a heat of crystallization which is a criterion of the average molecular weight, the PTFE fine particles of the present invention have a value of 62 J/g or less, and a half-width of a melting curve which is a criterion of the molecular weight distribution is broad, for example 10 degrees or larger.

The colloidal PTFE fine particles of the present invention may be prepared by a conventional emulsion polymerization technique, but the core part and the shell part are polymerized under different polymerization conditions. For example, a process for preparing the colloidal PTFE fine particles comprises polymerizing high molecular weight PTFE using a water-soluble polymerization initiator in an aqueous medium in the presence of an anionic surfactant (emulsifier) having substantially no telogen activity (step I) and then polymerizing low molecular weight PTFE by the addition of an additional amount of the polymerization initiator and preferably a chain transfer agent (step II). Steps I and II can be carried out continuously in a single reactor or step-wise (namely, a so-called seed polymerization).

Practically, each particle does not necessarily have a clear core/shell boundary. Rather, it may be prepared by gradually changing the polymerization conditions from those for the preparation of high molecular weight PTFE to those for the preparation of low molecular weight PTFE.

The conditions in step I may be substantially the same as those in the preparation of the latex for the conventional fine powder of PTFE. For example, the polymerization is carried out under TFE pressure of 6 to 40 kg/cm$^2$ at a temperature of about 10° to 120° C. in an aqueous medium.

Preferably, the aqueous medium contains a water-soluble fluorine-containing dispersant of the formula:

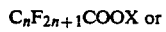

$C_nF_{2n+1}COOX$ or

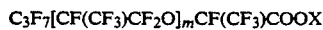

$C_3F_7[CF(CF_3)CF_2O]_mCF(CF_3)COOX$ wherein n is a number of 6 to 9, m is a number of 1 to 2 and X is NH$_4$ or an alkali metal, in an amount of 0.01 to 1% by weight based on the weight of the aqueous medium.

As the polymerization initiator, water-soluble organic or inorganic peroxides such as disuccinic acid peroxide (DSAP) or persulfates can be used independently or in combination with a reducing agent.

The molecular weight of PTFE produced in the step I is measured by sampling a part of the aqueous dispersion before it is transferred to the step II and drying it to obtain a powder.

When the molecular weight of PTFE is expressed in terms of a standard specific gravity (SSG) which is conventionally used as a criterion of the molecular weight of PTFE (see ASTM D-1457 83a), PTFE produced in step I has SSG of 2.210 or less, preferably from 2.200 to 2.149. The molecular weight of the core part is usually from 1,500,000 to 9,000,000. Herein, the equation:

$$\log_{10} Mn = 31.83 - 11.58 \times SSG$$

wherein Mn is an average molecular weight is used.

When the molecular weight is high, namely SSG is small, the physical properties of PTFE such as abrasion resistance are improved.

The molecular weight can be adjusted by selecting types and amounts of the polymerization initiator and the chain transfer agent. Usually, an amount of the polymerization initiator is from 0.1 to 1000 ppm.

In step I, it is possible to add at least one flurorine-containing olefin which is copolymerizable with TFE as a modifier in an amount sufficient for making a spherical shape of the finally produced colloidal particles. The addition of such olefin will improve the dispersion stability of the latex during the polymerization reaction. Examples of the fluorine-containing copolymerizable olefin are chlorotrifluoroethylene, hexafluoropropylene, perfluorobutylethylene, perfluoromethyl vinyl ether, perfluoropropyl vinyl ether and the like. An amount of such olefin is usually from 0.001 to 0.5% by weight, preferably from 0.005 to 0.2% by weight based on the weight of the polymer.

In the step II for forming the shell after step I, a larger amount of the polymerization initiator than in step I, for example, 10 to 10,000 ppm is added or a large amount of the chain transfer agent is added, or both are added to produce a low molecular weight PTFE. In this step, the use of a modifier is not preferred. The reaction conditions such as the reaction temperature and TFE pressure are not necessarily the same as those in step I. An additional amount of the water-soluble fluorine-containing dispersant can be added.

The molecular weight of the PTFE in the shell can be the same as that of the commercially available low molecular weight PTFE powder used for addition, and is usually from 10,000 to 800,000.

It is essential that the low molecular weight PTFE of the shell is not fibrilled, and the molecular weight may not be exactly in the range between 10,000 and 800,000. PTFE having the molecular weight in this range is a brittle solid polymer having melt flowability.

Different from PTFE in the core, the molecular weight of the shell PTFE alone cannot be measured. A broad endothermic curve of the crystal melting recorded by DSC has at least two peaks, one of which may be a shoulder rather than a clear peak. But, because of the influences of the core and the shell with each other, the molecular weight cannot be determined from the peak temperature (melting point) on the lower temperature side. Since the amount of the polymerization initiator or the chain transfer agent in step II is larger than that in step I or the chain transfer agent is used in step II, the shell PTFE produced in step II is reasonably expected to have the same molecular weight as PTFE which is prepared by polymerizing TFE alone under the same polymerization conditions as in step II.

As the chain transfer agent to be used in steps I and II, used are water-insoluble chain transfer agents such as hydrocarbons (e.g. methane, ethane, propane, etc.) and halogenated hydrocarbons (e.g. $CH_3Cl$, $CH_2Cl_2$, etc.), and water-soluble chain transfer agents such as methanol and ethanol. In the step II, hydrocarbons such as methane and ethane or the halogenated hydrocarbons such as $CH_3Cl$ and $CH_2Cl_2$ are more preferred than the water-soluble chain transfer agents.

An amount of the chain transfer agent is usually from 100 ppm to 10% by weight based on the amount of water.

In one or both of steps I and II, it is recommendable to add a water-insoluble hydrocarbon or halogenated hydrocarbon which is in the liquid state at the reaction temperature and inactive to the reaction as the dispersion stabilizer.

The colloidal PTFE fine particles of the present invention have an average particle size of 0.05 to 1 $\mu$m, preferably 0.1 to 0.5 $\mu$m. The particle size can be controlled by a conventional technique employed in the emulsion polymerization of TFE. The particle size has a great influence on the viscosity of the aqueous or nonaqueous paint which is prepared from the PTFE fine particles.

A solid content in the finally produced aqueous dispersion of the colloidal PTFE fine particles is usually from 5 to 50% by weight, preferably from 10 to 40% by weight.

The produced colloidal PTFE fine particle is deemed to have the core/shell structure. A weight ratio of the core to the shell is from 95:5 to 30:70, preferably from 90:10 to 50:50. This weight ratio is based on the assumption of the clear two layer structure, though the structure of the PTFE fine particle of the present invention may not have a clear two layer structure and the molecular weight may be continuously changed from the core to the shell.

In the case where the weight ratio of the core to the shell is in the above range, the PTFE powder is easily redispersed when the aqueous or nonaqueous paint is prepared from the aqueous dispersion containing the PTFE fine particles of the present invention or from the powder which is obtained by coagulating and drying the aqueous dispersion. Further, the PTFE powder does not suffer from an increase of viscosity or recoagulation due to fibrillation when it is blended with the molding resin or elastomer.

When the ratio of the core is larger than the above upper limit, the product has poor dispersibility in an organic medium like the conventional colloidal PTFE fine particles and is easily fibrilled in case of blending with the molding resin or elastomer. When the ratio of the core is smaller than the above lower limit, though the dispersing or blending properties are good, the coating film or the blend material does not have good abrasion resistance or durability.

When the ratio of the core exceeds the above range, the sintered PTFE powder obtained by heating and pulverizing the above coagulated dry PTFE powder has a whisker shape after pulverization and the particle size exceeds 50 $\mu$m. When the ratio of the core is smaller than the above range, the sintered PTFE powder has the same properties as those of the commercially available sintered PTFE powder having a low molecular weight.

It is possible to prepare an organosol from the aqueous dispersion of the PTFE fine particles of the present invention by phase transfer method disclosed in Japanese Patent Publication No. 17016/1974. By the addition of a film-forming material, the organosol is used as a nonaqueous paint. Alternatively, by the addition of a pigment or other resin to the aqueous dispersion, the aqueous dispersion as such can be used as an aqueous paint.

The aqueous dispersion of the PTFE fine particles of the present invention is coagulated by an inorganic acid or alkali or a water soluble inorganic or organic salt and dried at a temperature lower than the melting point of PTFE to obtain PTFE powder, and such powder can be used as an additive to an aqueous or nonaqueous paint, which additive is easily dispersed in the aqueous or nonaqueous medium.

Examples of the film-forming material are nitrocellulose, cellulose acetate butyrate, alkyd resin, polyester resin, polyurethane resin, phenol-formaldehyde resin, urea-formaldehyse resin, melamine-formaldehyde resin, epoxy resin, polyimide resin, polyamide resin, polyamideimide resin, polyethersulfone resin, silicone resin and the like. Also, a combination of a carboxylic dianhydride and a dianiline which easily react to form a polyimide resin can be used. Examples of the carboxylic dianhydride are pyromellitic dianhydride, benzophenonetetracarboxylic dianhydride and the like. Examples of the dianiline are oxydianiline, methylenedianiline and the like.

The paint can be applied on a substrate by impregnation in inorganic or organic woven or nonwoven fabrics, or spray, brush or dip coating on a metal (e.g. aluminum or iron) or ceramics and used in domestic or industrial applications, for example, cooking utensils, boilers, molds, tent materials, rollers, pistons or bearings by utilizing excellent functions of PTFE such as sliding property, non-tackiness, soil-proofing, heat resistance, chemical resistance and weather resistance.

Since the particles of the sintered PTFE powder of the present invention are fused together by heat treatment, the sintered powder has a smaller specific surface area and is harder than the non-heat treated powder. The heat treatment is carried out preferably at a temperature higher than the melting point of PTFE, and the heated powder is cooled and pulverized by the mill or pulverizer. The average particle size is usually from 10 to 60 $\mu$m, preferably from 10 to 40 $\mu$m, and the specific surface area is usually from 1.0 to 5.0 $m^2/g$, preferably from 1.5 to 4.0 $m^2/g$.

The PTFE powder obtained by coagulating and drying the aqueous dispersion of the PTFE fine particles of the present invention and the sintered PTFE obtained by heating and pulverizing the former powder can be added to a liquid or semi-solid material such as an oil, a grease or an ink as well as the paint. The use of the powder for blending with the molding resin or elastomer is also an important use of the PTFE powder of the present invention. The PTFE powder of the present invention can be used as a modifier for improving flame retardance, non-tackiness, sliding property, water- and oil-repellence, electrical properties, soil-proofing, corrosion resistance, weather resistance and the like, or as a white pigment. For example, the PTFE powder of the present invention is useful as a modifier of engineering plastics including polyacetal, polycarbonate, polyether ether ketone, all aromatic polyester, polyethylene terephthalate, polyphenylene sulfide, polyamide, modified polyphenylene oxide, polybutylene terephthalate, polysulfone, polyimide and the like.

In the following Examples, properties are measured or tested by the following methods:

1. Number Average Particle Size of Latex Fine Particles

A calibration curve is generated from a number average lengthwise particle size calculated from particle sizes in one direction in a transmission electron microscopic photograph.

A transmittance of light having a wavelength of 550 nm through a unit length of a polymer latex diluted to a solid content of 0.22% by weight with water is measured.

Then, the number average particle size is read from the calibration curve.

2. Standard Specific Gravity (SSG)

SSG is defined as a ratio of a weight in air of a PTFE sample prepared by a standard method to a weight of water having the same volume as the sample at 23° C.

The standard PTFE sample is prepared by placing 12 g of dried PTFE powder evenly between a pair of aluminum foils which are contained in a cylindrical metal mold having a diameter of 2.86 cm, gradually increasing pressure on the sample over about 30 seconds up to a final pressure of about 352 kg/cm$^2$ and keeping this pressure applied for 2 minutes. The resulting pre-molded article is placed in an air oven at 290° C. and the temperature in the oven is raised from 290° C. to 380° C. at a heating rate of 2° C./min., kept at 380° C. for 30 minutes, and lowered down to 294° C. at a cooling rate of 1° C./min. Then, the sample is removed from the oven and kept standing at 23° C. for 3 hours.

In general, SSG is used as an indirect expression of the number average molecular weight of unmodified tetrafluoroethylene polymer, and the smaller SSG means the larger the molecular weight.

3. DSC Measurement

Using the 1090 type differential scanning calorimeter manufactured by DuPont, temperature of a sample is raised from 200° C. to 370° C. at a heating rate of 10° C./min. and a melting endothermic curve is recorded. Immediately thereafter, the sample is cooled down to 200° C. at a cooling rate of 10° C./min. to record an exothermic curve of crystallization.

With the endothermic curve, a base line is drawn between a point on the curve at 290° C. and a point on the curve at 350° C., and a peak width at a half of the maximum height of the peak from the base line is regarded as a half width and expressed in a unit of "degrees" (see FIG. 1).

With the exothermic curve, a base line is drawn between a point on the curve at 270° C. and a point on the curve at 330° C., and the heat of crystallization is calculated from an area surrounded by the curve and the base line (see FIG. 1). The smaller heat of crystallization means the larger the molecular weight.

4. Melt Viscosity

Using a KOKA type flow tester manufacture by Shimadzu, polymer powder is charged in a cylinder having an inner diameter of 11.3 mm, kept at 380° C. for 5 minutes and loaded by a piston (7 kg or 32 kg) to extrude the molten polymer through an orifice having an inner diameter (2 R) of 0.21 cm and a length (L) of 0.8 mm. Then, a flow amount (Q: cm$^3$/sec.) is measured and a melt viscosity is calculated according to the following equation:

$$\text{Melt viscosity (poise)} = \frac{\Delta P \cdot 2R \cdot \pi \cdot R^3}{16 \cdot L \cdot Q}$$

wherein $\Delta P$ is a load (dyne).

5. Paste Extrusion Test

Fifty grams of fine powder and 10.8 g of a hydrocarbon as an extrusion aid (IP 1620, a trade name of Idemitsu Petrochemical Co., Ltd.) are mixed in a glass bottle and aged at room temperature (25°±2° C.) for one hour. Then, the mixture is charged in an extrusion die (having a squeezing angle of 30 degrees and, at the downstream end, an orifice of 2.54 mm in inner diameter and 7 mm in land length) equipped with a cylinder having an inner diameter of 25.4 mm and kept under a load of 60 kg applied on a piston inserted in the cylinder for one minute.

Thereafter, the mixture is extruded at a ram speed (a lowering speed of the piston) of 20 mm/min. During a period when the pressure is equilibrated in a latter half of the extrusion time, the pressure is divided by a cross sectional area of the cylinder to give an extrusion pressure (kg/cm$^2$).

6. Measurement of Particle Sizes of Finely Pulverized Powder

The PTFE powder is dispersed in a 2 wt % aqueous solution of $C_7F_{15}COONH_4$ by applying ultrasonic wave and particle sizes are measured by a gravity-sedimentation method using CAPA 500 (manufactured by Horiba Manufacturing Co., Ltd.).

7. Friction and Abrasion Tests

A Suzuki-Matsubara type friction and abrasion tester (manufactured by Orientec) and S45C (surface roughness $R_a$ of 0.1 to 0.3 μm) as an objective material are used.

A coefficient of dynamic friction and a specific abrasion wear are measured for a sliding time of one hour at a surface pressure of 30 kg/cm$^2$ at a rate of 30 m/sec. and calculated according to the following equation:

$$\text{Specific abrasion wear} \ (\times 10^2 \text{ mm}^3/\text{kg/km}) = \frac{\text{Abrasion wear}}{\text{Running distance} \times \text{contact area} \times \text{density}}$$

8. Preparation of Organosol

According to the method of Japanese Patent Publication No. 63584/1988, 125 parts by weight of n-hexane (phase transfer liquid) is added to the latex per 100 parts by weight of the solid in the latex, and then 275 parts by weight of acetone (phase transfer agent) was added to the mixture while stirring. After 5 minutes stirring, the mixture was kept standing and the supernatant liquid is discarded. To the residual precipitate, 400 parts by weight of methyl isobutyl ketone is added and the mixture is heated to about 100° C. while stirring to remove the remaining water.

PREFERRED EMBODIMENTS OF THE INVENTION

The present invention will be illustrated by the following Examples.

EXAMPLE 1

In a 6 liter stainless steel (SUS 316) autoclave equipped with a stainless steel anchor agitator and a temperature controlling jacket, deionized water (2960 ml) and ammonium perfluorooctanoate (1.0 g) were charged and, at 55° C., an internal atmosphere was replaced with nitrogen gas three time and TFE gas twice to remove oxygen. Then, an internal pressure was raised to 8 kgf/cm$^2$ with TFE and the mixture was stirred at 250 rpm at 55° C.

To the autoclave, hexafluoropropene (HFP) (0.4 g) and then a solution of 45 mg of ammonium persulfate (ASP) in 20 ml of water (concentration of 23 ppm) were injected with TFE to rise the internal pressure to 9 kgf/cm$^2$. Though the reaction proceeded acceleratedly, the temperature and the stirring rate were kept at 55° C. and 250 rpm, respectively. TFE was continuously supplied to keep the internal pressure always at 9±0.5 kgf/cm$^2$.

When an consumed amount of TFE reached 420 g after the addition of the polymerization initiator (ASP), the supply of TFE and stirring were stopped, and TFE in the autoclave was discharged.

Thereafter, while the internal pressure was increased up to 9 kgf/cm$^2$ with TFE, a solution of 700 mg of ASP in 20 ml of water (concentration of 233 ppm) and 1,2-dichloroethane (20 g) were injected. The reaction was restarted by stirring, and TFE was continuously supplied to keep the internal pressure always at 9±0.5 kgf/cm$^2$.

A total amount of consumed TFE reached 600 g, the stirring and the supply of TFE were stopped, and the gas in the autoclave was discharged to atmospheric pressure to terminate the polymerization reaction.

A weight ratio of the core to the shell was calculated to be 420:180=70:30.

The total reaction time was 17 hours, the number average particle size was 0.19 μm, and the polymer concentration (solid content) was 16.7% by weight.

To a part of the obtained latex, ammonium carbonate was added, and a mixture was stirred to coagulate the polymer. The coagulated polymer was washed with water and dried at 140° C. for 15 hours.

With the dried polymer, the content of HFP was determined from the IR spectrum according to the method described in Japanese Patent Publication No. 4643/1963. It was 0.05% by weight.

Three mg of the dried powder was subjected to the DSC analysis. The recorded curve is shown in FIG. 1. The half width was 18 degrees, the heat of crystallization was 52 J/g, and the peak temperatures were 327.0° C. and 337.5° C.

The obtained latex was subjected to the preparation of organosol. A uniformly dispersed organosol was prepared.

A part of the dry powder was paste extruded. The extruded polymer was discontinuous and had no strength which could be imparted by fibrillation. The equilibrated extrusion pressure was unstable and around 47 kg/cm$^2$.

The core polymer sampled in the course of the polymerization had SSG of 2.170 and the specific melt viscosity of $1.2 \times 10^{11}$ poises.

A part of the dry powder was heat treated and pulverized. The powder was placed in an air-circulation type electric furnace kept at 350° C. After keeping the polymer mass at that temperature for one hour and cooling it down to 250° C. at a cooling rate of 0.5° C./min., the polymer was removed from the furnace and cooled down to room temperature. The cooled polymer was ground by a rough grinder to a particle size of about 2 to 5 mm and then pulverized three times with a Rotor Speed Mill P-14 (manufactured gy Flichu) with a screen mesh of 0.08 mm at 20,000 rpm. The sintered PTFE powder had the average particle size of 29 μm and the specific surface area of 1.9 m$^2$/g and contained few whisker shape particles.

Then, the sintered PTFE powder was blended with polyphenylene sulfide as follows:

A polyphenylene sulfide resin (Fortlon 1140 Al, a polyphenylene sulfide resin containing 40% by weight of glass fibers manufactured by Polyplastics) (2400 g) and the above sintered PTFE powder (600 g) were heated and kneaded at 320° C. and extruded with a different-direction twin screw extruder (Laboplastmill manufactured by Toyo Seiki Kabushikikaisha) to produce molding pellets. The pellets were supplied to an injection molding machine in which a cylinder temperature and a mold temperature were kept at 320° C. and 140° C., respectively and injection molded to produce a test piece for the friction and abrasion test.

The friction and abrasion test was carried out. A coefficient of friction was 0.1 and a specific abrasion wear was 0.5 ($\times 10^2$ mm$^3$/kg/km).

On the contrary, when the commercial available PTFE powder for addition (L-169 J manufactured by Asahi Fluoropolymer), abnormal wear, namely melting due to frictional heat occurred.

To estimate the molecular weight of the shell polymer, the polymerization reaction under the same conditions as in the formation of the shell was carried out. Namely, under the same conditions as those for initiating the polymerization of the shell polymer, water and the dispersant were charged in the reactor. Then, polymerization was initiated in the presence of 20 g of 1,2-dichloroethane by the addition of 233 ppm of APS and terminated when 180 g of TFE monomer was consumed. The resulting latex was coagulated, washed and dried to obtain PTFE powder, which had a melting point of 321.2° C. and a half width of the peak of 3.0 degree. A number average molecular weight (Mn) was calculated according to the following equation:

$$Mn = 200/[685 \times (1/Tm - 1/600)]$$

wherein Tm is a melting point (K) which is well know to calculate a number average molecular weight of PTFE having a melting point lower than 327.0° C. (cf. U.S. Pat. No. 3,067,262). The number average molecular weight was 18,000.

EXAMPLE 2

In the same manner as in Example 1 except that no HFP was used, a total amount of TFE was 780 g, a weight ratio of the core and the shell was adjusted at 50:50, the amount of APS in the step I was 10 ppm based on the whole water, and the amount of APA in the step II was 600 ppm based on the whole water and the amount of 1,2-dichloroethane was changed to 36 g, the polymerization was carried out. The total reaction time was 20 hours, the number average particle size of PTFE particles was 0.22 μm, and the polymer concentration (solid content) was 20.6% by weight.

The obtained latex was subjected to the organosol preparation. A uniformly dispersed organosol was prepared.

A part of the resulting latex was coagulated, washed and dried in the same manner as in Example 1. The dry powder (3.0 mg) was analyzed to DSC to find that the half width was 13 degrees, a heat of crystallization was 58 J/g, and peak temperatures were 327.0° C. and 333.0° C.

A part of the dry powder was paste extruded. The extruded polymer was discontinuous and had no strength which could be imparted by fibrillation. An equilibrated extrusion pressure was unstable and around 29 kg/cm².

Then, in the same manner as in Example 1, the dry powder was sintered and pulverized. The sintered PTFE powder had an average particle size of 40 μm and contained few whisker or abnormal particles.

Figure 2:
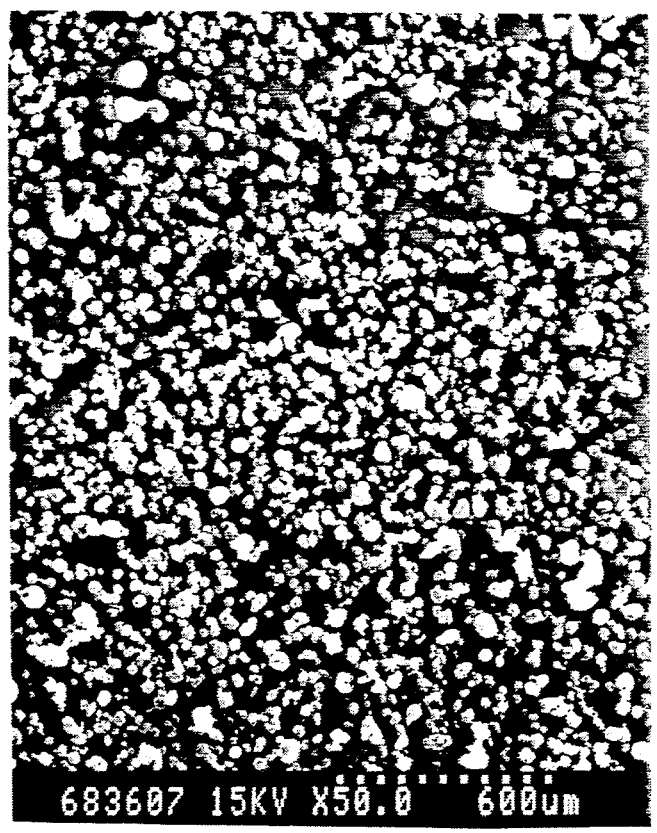
FIG. 2 is an electron microscopic photograph of the PTFE powder produced in Example 2.

The electron microscopic photograph of this powder is shown in FIG. 2.

COMPARATIVE EXAMPLE

In the same manner as in Example 1 except that no HPF was used, the total amount of TFE was 600 g, and neither APS nor 1,2-dichloroethane was additionally added in step II, the polymerization was carried out. The total reaction time was 5.5 hours, the number average particle size of PTFE particles was 0.23 μm, and the polymer concentration (solid content) was 6.7% by weight.

The obtained latex was subjected to the organosol preparation. The colloidal particles were heavily coagulated and no uniformly dispersed organosol was prepared.

A part of the resulting latex was coagulated, washed and dried in the same manner as in Example 1. The dry powder (3.0 mg) was analyzed to DSC to find that the half width was 13 degrees, a heat of crystallization was 31 J/g, peak temperature was 340.0° C. and SSG was 2.174 (Mn=4,500,000).

A part of the dry powder was paste extruded. The extruded polymer was continuous and uniform. An equilibrated extrusion pressure was around 89 kg/cm².

Then, in the same manner as in Example 1, the dry powder was sintered and pulverized. The sintered PTFE powder had an average particle size of 90 μm and contained many whisker or abnormal particles.

Figure 3:
FIG. 3 is an electron microscopic photograph of the PTFE powder produced in Comparative Example 1.

The electron microscopic photograph of this powder is shown in FIG. 3.

We claim:

1. Colloidal polytetrafluoroethylene fine particles having an average particle size of 0.05 to 1.0 μm and each comprising a core mode of polytetrafluoroethylene which has a high molecular weight, a standard specific gravity (SSG) of 2.210 or less and can be fibrilled and a shell surrounding said core made of a low molecular weight homopolymer of tetrafluoroethylene having a molecular weight of 10,000 to 800,000, which can not be fibrilled.

2. The colloidal polytetrafluoroethylene fine particles according to claim 1, wherein a weight ratio of said core to said shell is from 95:5 to 30:70.

3. A polytetrafluoroethylene powder obtained by coagulating and drying an aqueous dispersion containing a colloidal polytetrafluoroethylene fine particles as claimed in claim 1.

4. A sintered polytetrafluoroethylene powder obtained by sintering and pulverizing a polytetrafluoroethylene powder as claimed in claim 3.

5. The colloidal polytetrafluoroethylene fine particles according to claim 1, wherein a weight ratio of said core to said shell is from 90:10 to 50:50.

6. The colloidal polytetrafluoroethylene fine particles according to claim 1, wherein the average particle size is 0.1 to 0.5 μm.

7. The colloidal polytetrafluoroethylene fine particles according to claim 1, wherein the shell has a melt viscosity of about $10^2$ to $10^6$ poises.

8. The colloidal polytetrafluoroethylene fine particles according to claim 1, wherein the core has a number average molecular weight of 1,500,000 to 9,000,000.

9. The colloidal polytetrafluoroethylene fine particles according to claim 1, wherein the core has a standard specific gravity (SSG) of 2.210 to 2.149.

10. The colloidal polytetrafluoroethylene fine particles according to claim 1, wherein the core has a standard specific (SSG) of 2.20 to 2.149.

* * * * *